United States Patent Office

3,152,989
Patented Oct. 13, 1964

3,152,989
LIQUID LUBRICANTS COMPRISING MIXED CALCIUM CARBONATE-ACETATE SOLS
Joseph Versteeg, Roselle, Max W. Hill and Elbert D. Nostrand, Westfield, and Richard F. Finn, Cranford, N.J., assignors to Esso Research and Engineering Company, a corporation of Delaware
No Drawing. Filed Jan. 6, 1961, Ser. No. 103,949
7 Claims. (Cl. 252—18)

The present invention concerns liquid lubricating oil compositions having improved detergency, extreme pressure, and antiwear properties. The invention is particularly directed to improvements in lubricating oils for diesel engines in marine service. The improved lubricants contain colloidal dispersions of mixed calcium acetate and calcium carbonate.

While it has been known for some time that calcium acetate is extremely effective as an additive for lubricating oil compositions because of its ability to reduce wear and to impart extreme pressure properties, simple dispersions of the additive are unstable and tend to settle out in storage. Stable suspensions of calcium acetate can be made with the aid of simple metal soaps and they can also be made by complexing the calcium acetate with high molecular weight fatty acid salts or soaps. Such suspensions still present problems when employed in the lubrication of marine diesel engines, however.

In the very large diesel engines that are used for marine propulsion, while the bearings are generally lubricated by the crankcase oil, the pistons and liners are lubricated separately by means of a special cylinder oil which is injected into each cylinder and is largely consumed during combustion of the fuel. The cylinder oil is generally fed to each cylinder of the engine by passing it through a forced feed lubricator provided with a pump and a feed line, the latter having a sight glass containing a suitable fluid that is not miscible with the lubricating oil. The rate at which the lubricant is fed to each particular cylinder can thus be determined visually by noting the passage of drops of the lubricant through the fluid in the sight glass. Experience has indicated that the best fluid to use in the sight glass is a mixture of glycerol and water. However, lubricants that are desirable for cylinder lubrication tend to take up or displace the sight glass fluid. Thus, after a number of days all of the fluid will be displaced from the sight glass and until that fluid is replaced it is impossible to determine the lubricant flow rate to the cylinders. If the lubricant has a relatively short sight glass fluid life, i.e., if it tends to remove all of the fluid within a relatively short time, say 30 days or so, considerable work is entailed for the ship crew in changing and replacing the sight glass fluid. This also represents a possible hazard to the marine diesel engine since the rate of flow of lubricant to the engine cylinders cannot be detected if the sight glass fluid has disappeared.

There thus has been a need for a lubricant that will have satisfactory anti-wear properties in marine diesel service but which will also have a long sight glass life. While calcium acetate dispersions have been satisfactory from the standpoint of anti-wear properties, their sight glass life has left something to be desired. There also has been need for calcium acetate dispersions that are more stable and less turbid than the calcium acetate dispersions heretofore available.

In accordance with the present invention, it has been found that if a colloidal dispersion of calcium carbonate in mineral oil is partially decomposed by treatment with acetic acid under properly controlled conditions, a mixed dispersion of calcium acetate and calcium carbonate is obtained which combines the anti-wear and extreme pressure properties of calcium acetate dispersions with the detergency properties and the clarity, fluidity and stability of calcium carbonate sols.

Colloidal sols of calcium carbonate in mineral oils are commercially available and are well known for their detergency, sludge dispersing and corrosion prevention properties. Such dispersions are usually stabilized by the presence of a surfactant material such as a metal sulfonate. Colloidal dispersions of calcium carbonate are not as satisfactory as calcium acetate dispersions, however, as cylinder lubricants for marine diesel service.

In preparing the lubricating oil compositions of the present invention a colloidal dispersion of calcium carbonate in mineral oil is first prepared or is obtained commercially. These dispersions will contain within the range of from 2.0 to 29.0 weight percent of $CaCO_3$. The $CaCO_3$ dispersion is heated to from 150 to about 400° F. and preferably 250 to 350° F., and to the heated dispersion is added slowly with vigorous agitation acetic acid either as a vapor or as a solution in a suitable solvent such as acetone or a hydrocarbon. Sufficient acetic acid is used to displace at least 5 percent and up to about 70 percent of the carbonate content of the dispersion. Ordinarily, up to about 20 percent of the carbonate can be displaced in this manner before turbidity and gelation result. However, if the calcium carbonate dispersion is first modified by adding from about 0.1 to about 50 percent of a phosphosulfurized hydrocarbon, it is possible to displace as much as 70 percent of the carbonate.

Phosphosulfurized hydrocarbons can be prepared by reacting a sulfide of phosphorus, for example $P_2S_5$, with a suitable hydrocarbon base stock which, of course, should be one that results in materials that are completely oil soluble after phosphosulfurization. The preferred hydrocarbon starting materials used in this invention are (1) heavy petroleum fractions, distillates or residua containing less than 5% of aromatics and having a viscosity at 210° F. of 140 to 250 SSU; and (2) polyolefins having a Staudinger molecular weight in the range of 500 to 200,000 and containing 2 to 6 carbon atoms per olefin monomer. The polybutenes, having Staudinger molecular weights in the range of 700 to 100,000 are particularly preferred.

Preferably the phosphosulfurized hydrocarbon is prepared by reacting approximately four moles of hydrocarbon base stock (e.g., a polyolefin) per mole of phosphorus pentasulfide. A slight excess of phosphorus pentasulfide over the 1 to 4 mole ratio can be used to insure complete phosphosulfurization. The phosphosulfurization reaction is conducted under anhydrous conditions at temperatures of 150° to 600° F. for a period in the range of 0.5 to 15 hours. A very slight amount of an alkyl phenol or alkyl phenol sulfide, preferably in the range of 0.001 to 1.0 percent by weight, can be added as a catalyst in the phosphosulfurization reaction. It has also proven very useful to treat or blow the phosphosulfurized product with an inert gas such as nitrogen for a period of 10 min. to 2 hours to aid in reducing hydrogen sulfide evolution and its corresponding odor. The preparation of phosphosulfurized hydrocarbons and the use of catalysts in the phosphosulfurization reaction are more fully described in U.S. Patent 2,875,188.

The following examples serve to illustrate the invention.

EXAMPLE 1

A quantity of a commercially available calcium carbonate sol containing calcium sulfonate as a surfactant, available commercially as Lubrizol OS-8130, containing 9.5 weight percent calcium, was heated to 250–350° F. A solution of 47 gm. of acetic acid in 400 gm. of Solvent 150 Neutral lubricating oil was heated to 190° F. and added slowly to 100 gm. of the vigorously agitated calcium carbonate sol over a period of 105 minutes. The variations in carbonate displaced were due to uncontrolled losses of acetic acid by vaporization due to variations in time of addition and batch size. Carbonate was determined by differences between initial charge and $CO_3$ analysis on the final product. The effects of various percentages of carbonate displacement are shown in Table I.

*Table I*

| Percent of Carbonate Displaced [1] | Appearance |
| --- | --- |
| 53 | Turbid with gelling. |
| 13 | Clear and fluid. |
| 12 | Do. |
| 6 | Do. |

[1] Original $CO_3$ content=2.1%.

The product in which 12 percent of the carbonate had been displaced was tested as a marine diesel cylinder lubricant. It was compared in this respect with a commercially available lubricant of the prior art comprising a complex of calcium acetate and calcium salts of $C_7$ to $C_{12}$ fatty acids (prior art product A). The comparison was made in a laboratory set-up of Manzell lubricators, a commercial type used on shipboard for metering lubricant. One quart a day, a reasonable shipboard value for each lubricator, was fed through the lubricators. The results of the test are presented in Table II.

*Table II*

| Lubricant: | Sight glass fluid life (days) |
| --- | --- |
| Prior art product A | 30-40 |
| 12% Ca acetate product | 88 |

It will be noted from the results that the product of the present invention had more than double the sight glass fluid life of the commercial product. These improvements were obtained without sacrificing properties under load, as shown by the almost identical improvements of the calcium carbonate product, the 12% calcium acetate product of the present invention, and the prior art product A described above over a mineral oil of similar viscosity.

*Table III*

| | Four ball wear scar (mm.), 140° C., 600 r.p.m., 15 K g. load |
| --- | --- |
| Blank (100 gm. Lubrizol OE-8130 in 400 gm. Solvent 150 Neutral) | 0.24 |
| Above product with 9% of $CaCO_3$ converted to Ca acetate | 0.24 |
| Prior art product A | 0.27 |
| Base oil | 0.36 |

EXAMPLE 2

A phosphosulfurized hydrocarbon was prepared on a plant scale by reacting 100 parts by weight of a polybutene having an average Staudinger molecular weight of about 1100 with 15 parts by weight of phosphorus pentasulfide for 8-12 hours at 425-450° F. with stirring and nitrogen blowing. The phosphosulfurized polybutene had the following typical Plant Production inspections.

| | |
| --- | --- |
| Phosphorus, weight percent | 3.45 |
| Sulfur, weight percent | 6.64 |
| Neutralization No. to pH of 4 mg__KOH/gram__ | 37 |
| Saponification No. _____do____ | 84 |
| Viscosity at 210° F., SSU | 20,000 |

EXAMPLE 3

Two weight percent of the phosphosulfurized hydrocarbon of Example 2 was added to a quantity of the calcium carbonate sol described in Example 1. Two similar experiments were made in which the carbonate was displaced from the sol containing the added phosphosulfurized hydrocarbon and a portion of the sol to which no phosphosulfurized hydrocarbon had been added. In each case 47 gm. of acetic acid was dissolved in 400 gm. of Solvent 150 Neutral oil, and these were slowly added to 100 gm. of the commercial product "Lubrizol OS-8130," mentioned above, over a time interval of one and a quarter hours. The amount of carbonate displaced in each case was then determined. The results are shown in Table IV.

*Table IV*

$P_2S_5$-TREATED HYDROCARBON PRESENT

| | 0% | 2% |
| --- | --- | --- |
| Percent $CO_3$ Displaced | 13 | 35 |

It will be seen that the phosphosulfurized hydrocarbon promoted the displacement of carbonate.

EXAMPLE 4

Four percent of the product obtained in Example 3 when using the phosphosulfurized hydrocarbon was added to heptane, this constituting a severe test in haze and brightness. Four percent of the prior art commercial product A described above was added to a separate quantity of heptane for comparison. As shown in Table V, the product of the invention was superior in stability and clarity to the commercial product.

*Table V*

APPEARANCE AND STABILITY OF CALCIUM ACETATE SYSTEMS IN HEPTANE

| | Product of Example 4 | Prior Art Product A |
| --- | --- | --- |
| Appearance | Translucent | Very turbid. |
| Solids on Bottom | Trace after two weeks | All solids separated in one day. |

EXAMPLE 5

A lubricating oil blend was prepared consisting of 900 gm. of a neutral lubricating oil having a viscosity of 100 SSU at 100° F., 17.6 gm. of the phosphosulfurized hydrocarbon of Example 2 and 200 gm. of calcium carbonate sol identified as Lubrizol OS-8130. The blend was heated to 350° F. 47 gm. of acetic acid was placed in a separate vessel and held at a temperature of 212° F. A stream of nitrogen was blown through the acetic acid container into the heated oil blend using a sparger device. The reaction was controlled to take place over a period of eight hours. The final product was a translucent sol which was determined to constitute a colloidally dispersed mixture of calcium acetate and calcium carbonate in a weight ratio of 70 to 30.

EXAMPLE 6

The reaction product of Example 5 gave a non-flowing grease when 2 gm. of water was added to 100 gm. of product. The latter product is usable as an instant grease. It can be poured into a difficultly accessible place, e.g., a bearing, as a liquid, then a small amount of water is added. The working of the lubricant in the bearing converts it into a grease which will remain in place over an extended time period. Such a product is very useful for lubricating the stern propeller shaft bearings on a ship. The requirement here is that the propeller shaft of a steamship must be lubricated with a fluid which makes a seal with the sea on a loose bearing. The product of Example 6 will readily solidify to a grease in contact with the sea.

Various modifications may be made in the formulation as will be apparent to those skilled in the art, without departing from the spirit and purpose of this invention. It is intended to cover such in the following claims so far as the state of the art permits.

What is claimed is:

1. The method of preparing an improved lubricant composition which comprises the step of treating a colloidal dispersion of calcium carbonate in mineral oil, at a temperature in the range of from about 150° to about 400° F., with acetic acid in an amount sufficient to displace from about 5 to about 70 weight percent of the carbonate component whereby a dispersion results, said dispersion containing calcium carbonate and calcium acetate in weight ratios within the range of from 5 parts calcium acetate and 95 parts calcium carbonate to about 70 parts calcium acetate to 30 parts calcium carbonate.

2. The method as defined by claim 1 wherein said treatment is effected by adding an oil solution of acetic acid to the said colloidal dispersion.

3. An improved lubricating oil composition comprising a major proportion of a mineral lubricating oil essentially free of metal salts of higher fatty acids and containing in minor proportion a colloidal dispersion of calcium acetate and calcium carbonate wherein the weight ratio of calcium acetate to carbonate is in the range of from 5 parts acetate and 95 parts carbonate to 70 parts acetate and 30 parts carbonate, the total calcium content of the dispersion being in the range of from about 2 to 29 weight percent calculated as calcium carbonate.

4. The improved lubricating composition of claim 3 wherein said dispersion has been obtained by adding acetic acid to a colloidal dispersion of $CaCO_3$.

5. The method of lubricating a marine diesel engine which consists in injecting into the cylinders of the engine a mineral lubricating oil composition comprising a major proportion of mineral lubricating oil essentially free of metal salts of higher fatty acids and a minor proportion of a colloidal dispersion of calcium acetate and calcium carbonate wherein the weight ratio of calcium acetate to carbonate is in the range of from 5 parts acetate and 95 parts carbonate to 70 parts acetate and 30 parts carbonate and wherein the total calcium content of the dispersion is in the range of from about 2 to 29 weight percent calculated as calcium carbonate.

6. The method as defined by claim 1 wherein said colloidal dispersion is first modified by adding thereto from 0.1 to 50 weight percent of a phosphosulfurized hydrocarbon prior to said treatment with acetic acid.

7. A lubricating composition which is normally liquid, but which solidifies to a grease consistency on contact with water, which comprises a major proportion of a mineral base oil and minor proportions of a phosphosulfurized hydrocarbon and of a colloidal dispersion of calcium carbonate and calcium acetate in a weight ratio within the range of from 5 parts calcium acetate and 95 parts calcium carbonate to about 70 parts calcium acetate to 30 parts calcium carbonate, the total calcium content of the dispersion being in the range of from about 2 to about 29 weight percent, calculated as calcium carbonate, said lubricating composition being essentially free of metal salts of higher fatty acids.

References Cited in the file of this patent

UNITED STATES PATENTS

| | | |
|---|---|---|
| 1,814,410 | Richter et al. | July 14, 1931 |
| 2,417,428 | McLennan | Mar. 18, 1947 |